Feb. 16, 1932.   O. F. LUNDELIUS   1,845,162
SPRING SUSPENSION SYSTEM
Filed Dec. 13, 1926   3 Sheets-Sheet 2
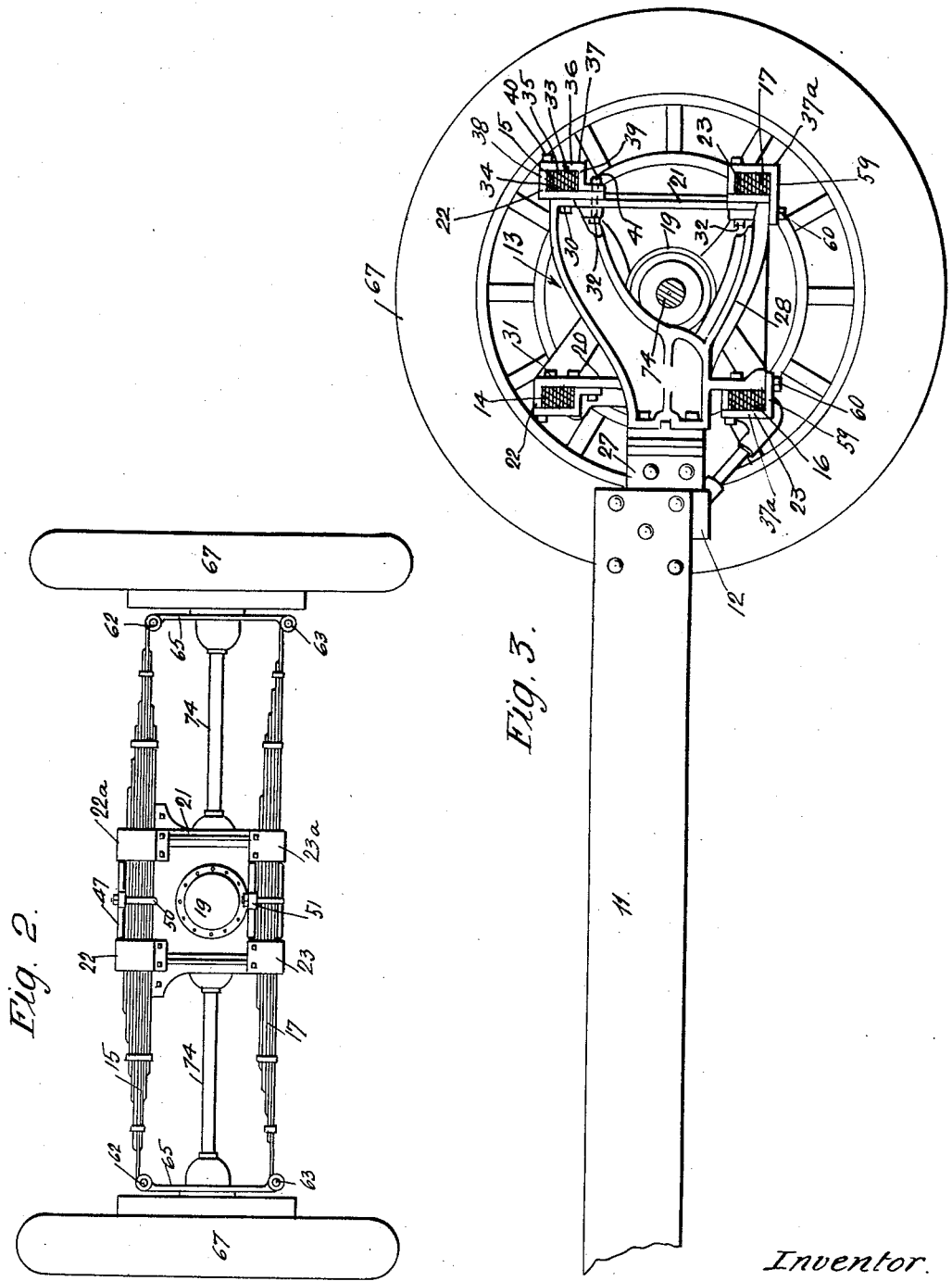
Inventor.
Oscar F. Lundelius
Attorney.

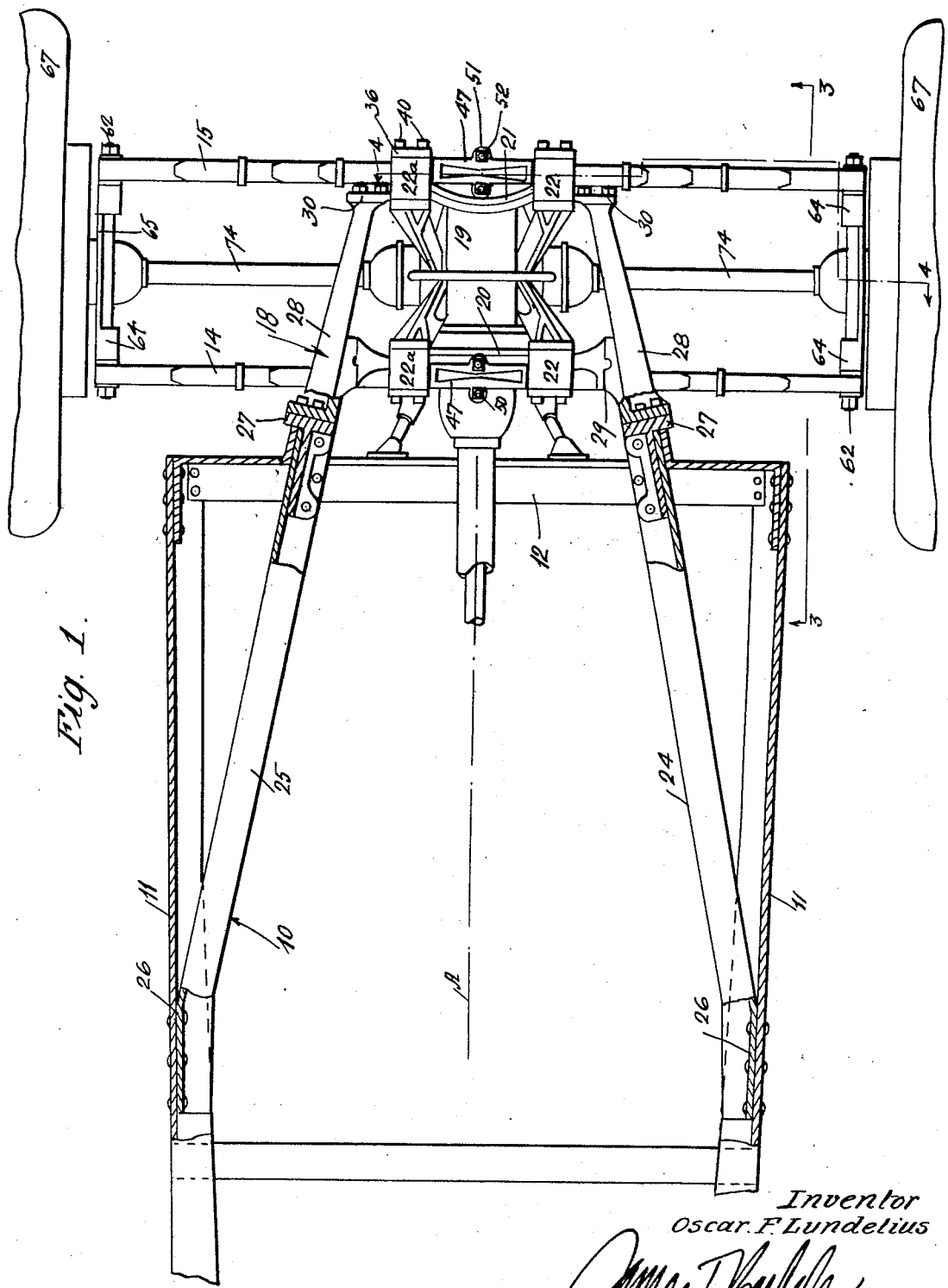

Feb. 16, 1932.    O. F. LUNDELIUS    1,845,162
SPRING SUSPENSION SYSTEM
Filed Dec. 13, 1926    3 Sheets-Sheet 3
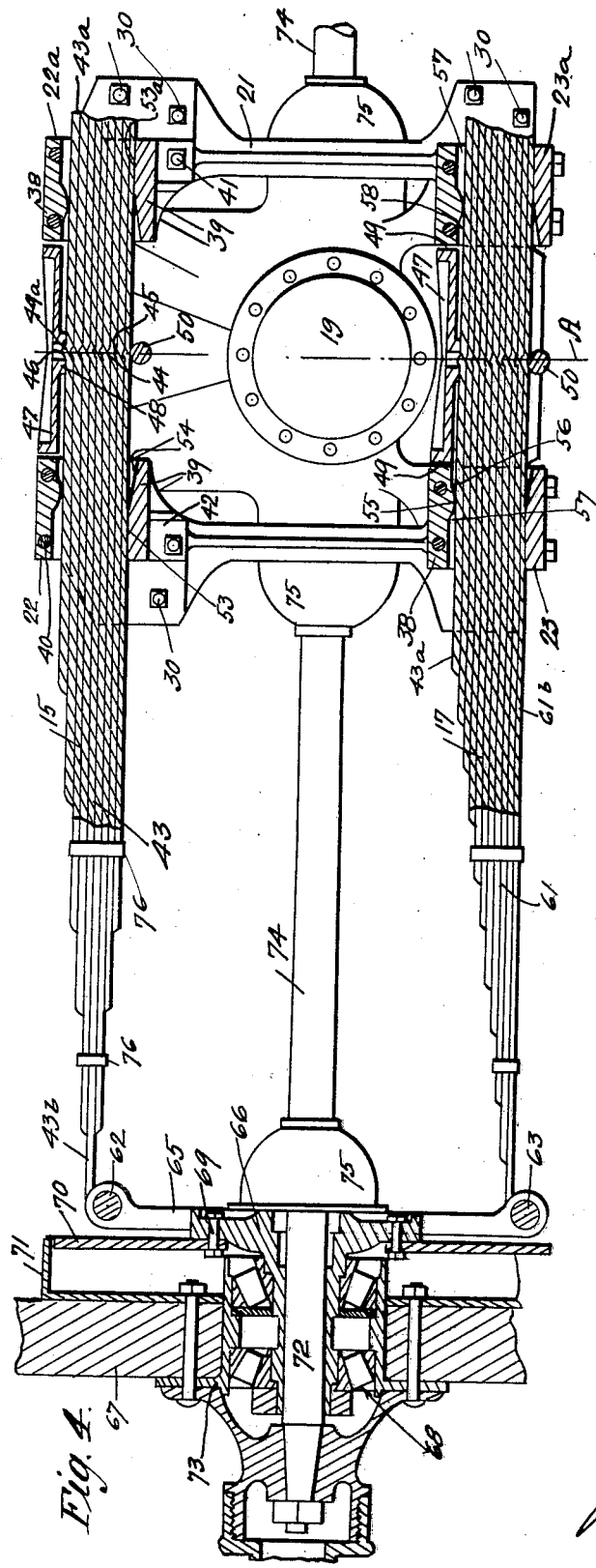
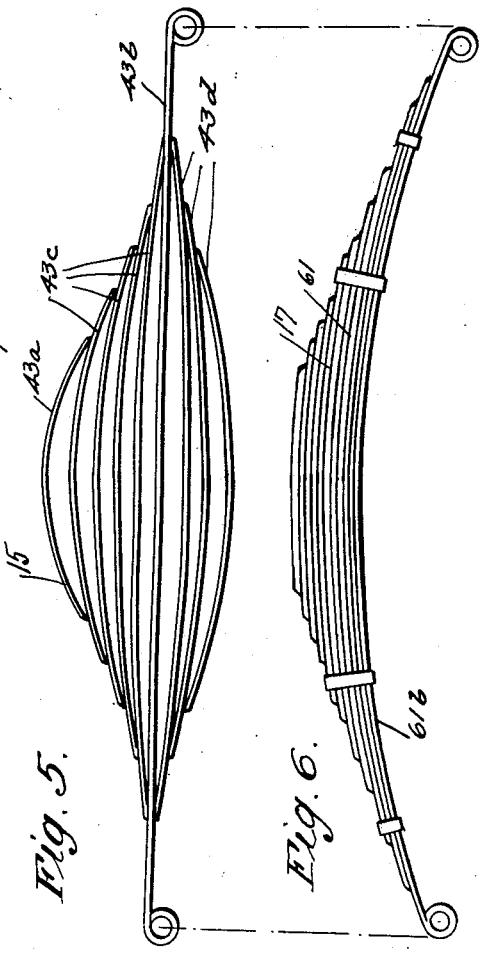
Inventor
Oscar F. Lundelius
Attorney.

Patented Feb. 16, 1932

1,845,162

UNITED STATES PATENT OFFICE

OSCAR F. LUNDELIUS, OF LOS ANGELES, CALIFORNIA, ASSIGNOR TO LUNDELIUS & ECCLESTON MOTORS CORPORATION, OF LAS VEGAS, NEVADA, A CORPORATION OF DELAWARE

SPRING SUSPENSION SYSTEM

Application filed December 13, 1926. Serial No. 154,383.

This invention has to do generally with spring suspension systems for vehicles, and more particularly for use in connection with vehicles wherein the wheels are laterally spaced and connected to the vehicle body directly by the spring system rather than by rigid axles.

Generally, my invention may be characterized as a spring system including a pair of vertically spaced springs between the vehicle frame and wheels, the springs being variational as regards their resistance to flexure. In other words, one of the springs is adapted to take the normal load and tend to flex when ordinary road obstructions or unevenness are encountered, while the other spring, which may be termed an over-load spring, is adapted merely to vibrate slightly or remain practically neutral when under normal load and to yield but comparatively 18 will be in position. Obviously, the same road obstructions or unevennesses are abnormally large.

By virtue of this arrangement, the normal load springs function in a manner to give easy riding characteristics to the vehicle when driven over good roads, for the over-load spring does not act to dampen the flexure of the normal load springs except under abnormal conditions, while the over-load spring immediately comes into play effectively to check over flexure of the normal load spring and hence act as a snubber and rebound check when rough road is encountered.

There is thus provided a spring system which in no way interferes with the normal spring action and hence the easy riding qualities of the vehicle over ordinarily good roads and yet immediately acts to check undue springing of the vehicle body when poor stretches of road are encountered. In other words, there is provided a self-contained spring and snubbing system.

This is in contradistinction to the usual system which is fully efficient only in caring for normal road conditions, and to which is added separate snubbing mechanism to care for abnormal road conditions. The addition of such separate snubbing mechanism ordinarily acts on the spring suspension system in a manner to make it less sensitive to slight unevennesses of roads, so that while it is adapted to take care of abnormal conditions, the snubbing mechanism destroys the smooth or velvety action of the normal spring system when ordinarily good roads are being driven over.

In the drawings I have illustrated an embodiment of my invention wherein the springs are arranged transversely with respect to the longitudinal axis of the vehicle, and I have shown two pairs of vertically spaced springs, and these springs being arranged symmetrically about substantially vertical and horizontal axial planes whereby the stresses and strains arising from road shock, traction, etc., are uniformly distributed throughout the whole spring system, which condition is of obvious advantage. However, I wish it to be distinctly understood that my invention, considered in its broader aspects, is not limited to this particular number of spring pairs or arrangement of individual springs, the showing merely being illustrative of a single embodiment from an understanding of which those skilled in the art may realize how the invention may be embodied otherwise.

Other objects and novel features of the invention will be made apparent in the following detailed specification, reference being had to the accompanying drawings in which:

Fig. 1 is a fragmentary plan view of a spring supported vehicle frame to which is applied an embodiment of my invention;

Fig. 2 is a reduced view of Fig. 1, looking from the right thereof;

Fig. 3 is a section on line 3—3 of Fig. 1;

Fig. 4 is an enlarged fragmentary section on line 4—4 of Fig. 1;

Fig. 5 is a view of the over-load spring before its individual leaves have been clamped together; and Fig. 6 is a view of the normal road spring after its individual leaves have been clamped together but before it has been applied to the vehicle.

I have shown my improved spring suspension system in connection with the rear end of a motor vehicle, but it will be understood it is fully as applicable and effective when applied to the forward end of the vehicle or to the sides thereof.

I will first describe the method of mounting the springs with some particularity, though this mounting is in no way limiting on the invention, it being understood that the detail is entered into merely in order that a full understanding of a preferred embodiment may be had.

The vehicle frame 10 includes side and end rails 11 and 12, respectively, these rails preferably being of channel cross-section. The spring suspension unit generally indicated at 13 includes four springs 14, 15, 16 and 17 which, together with their hangers or supports are symmetrically arranged about substantially vertical and horizontal axial planes, whereby the stresses and strains arising from road shocks, traction, etc., are uniformly distributed through the springs and their mountings rather than being concentrated on any one or less than the whole number of springs or mountings, which condition is of obvious advantage. However, this showing of a definite number of springs and the symmetrical arrangement thereof is in no way to be considered as limitative on the invention, for it will be apparent that a lesser number of springs may be provided or that the spring arrangement may be different from that shown without departing from the spirit and scope of my broader claims.

It will be noted that unit 13 extends to the rear of frame 10 and that the assembly generally indicated at 18 provides a supporting connection between said frame and unit. This rigid supporting connection also provides a rigid supporting connection between the frame and differential housing 19, it following that said differential housing and its associated mechanism is spring supported rather than being carried as unsprung weight.

The spring mounting making up a part of unit 13 includes fore and aft suspension plates 20 and 21, respectively, which are spaced apart in the direction of the longitudinal axis A of frame 10, and these plates each support a pair of upper spring boxes or hangers 22, 22a, and a pair of lower spring boxes or hangers 23, 23a. The upper boxes of a given plate are spaced equally from vertical axial plane A' (Fig. 4) and the lower boxes preferably directly underlie the associated upper boxes. As will be made apparent later, connection is made between plates 20, 21 by assembly 18, and said plates, in turn, are connected to opposite sides of housing 19, the housing thus being connected to frame 10 through the plates and assembly 18. Supporting connection 18 includes two arms 24 and 25 each secured at one end 26 to frame 10 and connected to rail 12 by casting 27. Extending from each casting is a yoke 28 secured to plates 20 and 21 at 29 and 30, respectively. The plates, in turn, are secured at 31 and 32 to opposite sides of housing 19.

Each pair of axially alined spring boxes or hangers is identic in construction, and I therefore will describe but one in detail, choosing for this purpose the upper boxes 22 and 22a on plate 21 (Figs. 3 and 4). Each of these boxes define a substantially rectangular opening 33 (Fig. 3) the opposed, vertical defining walls being the forward face 34 of plate 21 and the inner face 35 of the vertical arm 36 of demountable, angular cap 37. The top and bottom walls of the opening are defined by horizontal plate flange 38 and the horizontal arm 39 of cap 37, respectively. Said caps are removably fixed to the plate by bolts 40 and 41, the former passing through arm 36 into flanges 38, and the latter passing through depending vertical cap flanges 42 into plate 21.

Spring 15 is made up of a plurality of leaves 43, the leaf assembly being centered between boxes 22, 22a, and having the usual central, interfitting nibs 44 and recesses 45, this interfit being adapted to prevent appreciable relative longitudinal movement of the leaves. The nib 44a on the uppermost leaf 43a is adapted to enter the central aperture 46 provided in positioning block 47, the latter having a central depending lug 48 resting on top leaf 43a, and the ends of the block opposing the inner, opposed faces 49 of flanges 38. A U-bolt 50 is passed about leaves 43 and its ends extend through lugs 51 on the blocks (see Fig. 2) there being nuts 52 threaded on the ends of the U-bolt above the lugs and adapted to be taken up to hold the spring centrally compressed and to tie the block to the spring. While the block 47 is capable of vertical movement between flanges 38, said flanges limit the longitudinal movement thereof and consequently hold the spring in centered position.

The upper faces 53 of cap arms 39 preferably incline downwardly and inwardly as at 54 from about their centers, while lugs 55 depend from flanges 38 into engagement with the upper leaf 43a. Said lugs preferably are arcuate or somewhat rounded at their ends and extend inwardly from about the centers of flanges 38 to a point 56 spaced from the inner flange edges. Preferably, the clearances 57 at the outer sides of the boxes are of greater vertical extent as well as of greater longitudinal extent than reliefs or recesses 58 at the inner sides of the boxes.

By virtue of this arrangement, it will be seen that the mounting between plate and springs may be considered as of a pivotal nature, for when the outer ends of the spring are flexed upwardly, as occurs when one of the spring-supported wheels encounters road obstacles, said spring may have pivotal movement about lugs 55, the central portion of the spring, that is, the extent between boxes, bowing downwardly, and the spring thus being effective throughout its length, to obvious advantage. If only one end of the spring be directly flexed, the other end is flexed somewhat by reaction, and full working and advantage of the spring is thus had.

On rebound movements or where the ends of spring 67 tend to move downwardly by reason of road depressions, the horizontal portions 53a of faces 53 check this rebound or lowering spring movement to a considerable degree though clearances 58 allow a slight reverse flexure of the spring between boxes in order that the spring may not be overstrained. This checking or rebound snubbing action is thus gained without the use of elements extraneous to the mounting, rather being gained by the peculiar formation of the spring hangers or boxes, and the accomplishment of this action without independent snubbing mechanism is a feature of great merit as will be readily understood.

The mounting of the lower spring 17 is practically identical to the upper, except that an additional tie is had between boxes 23, 23a and differential housing 19, in that the horizontal arms 59 of box caps 37a extend beneath said housing and are bolted thereto as at 60 (Fig. 3). As before stated, the mounting of the springs on plate 20 are, in effect, identical with those just described in connection with plate 21.

The ends of intermediate or main leaves 43b of springs 14 and 15 and the lowermost leaves 61b of springs 16 and 17 have pivotal mounting on the horizontally extending, vertically spaced pins 62 and 63, respectively, these pins being supported in the horizontally spaced boxes 64 on vertical wheel plates 65, and said plates preferably, though not necessarily, carrying integral spindles 66 upon which wheels 67 are mounted through usual roller bearings 68. Plates 65 preferably also have attached thereto at 69 a circular plate 70 adapted to support usual, internal expanding brake means (not shown) adapted to coact with brake drums 71 on wheels 66. Wheel shafts 72 are drivingly connected to wheels 67 through hubs 73, and said shafts are drivingly connected by drive shafts 74 to the differential mechanism (not shown) within housing 19, universal joints 75 being interposed in the driving connection in order to allow for the dis-alinement of the differential and wheel shafts. Plates 65 individually thus provide independent supporting members for one of a pair of wheels, in contradistinction to the usual, rigid axle which supports both wheels.

It will be seen from the above that I have provided two pairs of vertically spaced springs, that is, pair 14, 16, and pair 15, 17, and that the springs of a given pair are substantially in vertical alinement. However, as noted at the outset, the invention is not limited to the provision of more than one pair of vertically spaced springs nor need the springs of a given pair be in vertical alinement, though these conditions are preferable. A discussion of a single pair of springs will suffice to give a full understanding of the invention, since the other pair is preferably, though not necessarily, similar.

The individual leaves 61 of the lower, normal-load spring 17, are arched and clipped together as shown in Fig. 6 before the spring is assembled with the frame and wheels. As soon as the spring is applied to the frame and wheels, however, the load of the frame is sufficient to more or less straighten out the spring, though there still may be a slight arch even under normal load.

The over load spring 15 is made up of the main or master intermediate leaf 43b to the ends of which the wheel plates are applied, said main leaf being substantially straight and of a length to reach from wheel plate to wheel plate when the normal load spring has been substantially straightened out under normal load. Applied to the upper face of leaf 43b are the superposed leaves 43c which gradually diminish in length as they approach the uppermost leaf 43a; and before being clamped to the main leaf, the leaves are given an upwardly bent arch formation. Applied to the lower face of main leaf 43b are the lower leaves 43d which are given a downward arch formation before being clamped to the main leaf. Preferably, though not necessarily, there is a preponderance of upper leaves, or said leaves are made of greater effective strength or resistance to flexure in order to care for the down-bearing load of the vehicle frame.

Before application to the vehicle frame and wheels, the several leaves are clamped together by clips 76 to bring them into substantial parallelism and full facial contact, the assembled spring then being substantially straight though it may be given a slight arch to correspond with the arch of the lower spring when the latter is under normal load.

The over load spring is applied to the frame and wheels while said frame is under normal load, it following that the wheel plates are spring held in substantially vertical, parallel position.

The over load spring may be considered as being substantially neutral or ineffective during comparatively slight relative vertical movement between the frame and wheels, said spring merely vibrating about its normal position as the lower spring flexes under normal road conditions, since its action is, in effect, delayed until the lower spring tends to flex abnormally. However, should the frame be over-loaded the upper spring resists over flexure of the lowermost spring and, whether the car be under normal or abnormal loading conditions, when abnormal road obstructions are met with, the upper spring comes into play to resist abnormal vertical movement between frame and wheels, thus acting as a snubber and rebound checker.

It will also appear that the afore-described characteristics of the spring boxes aid the overload spring in checking flexure of normal load spring in one direction, though said boxes are substantially ineffective in checking flexure in the opposite direction.

From the above it will be seen that I have provided a system wherein the desirable velvety or smooth spring action incident to travel over ordinarily good roads is not destroyed, and yet there is ever present means for checking and snubbing spring action whenever rough roads are encountered. It will also be noted that the same means which provides this checking and snubbing action also serves to care for down-bearing overload. The fact that all these advantageous points are gained without the application of independent mechanisms or structures, but rather that the system having these qualities is entirely self-contained, will make the utility and great efficiency of my invention apparent to those skilled in the art.

As a further feature, and this may also be embodied to advantage in any system including a pair of vertically spaced springs whether or not one spring has greater resistance to flexure under normal load than does the other, springs 15 and 17 may be so designed that they have different periods of vibration. The springs are thus prevented from vibrating in unison and the vehicle body thereby held from a disturbing "bouncing" action.

It will be understood the drawings and description are to be considered merely as illustrative of and not restrictive on the broader claims appended hereto, for various changes in design, structure and arrangement may be made without departing from the spirit and scope of said claims.

I claim:

1. A spring suspension system for a vehicle, embodying a frame and a pair of vertically spaced and substantially horizontally extending springs connecting a pair of wheels to the frame, one of said springs being bowed before being put into such connection, and the other spring being substantially straight before being put into such connection, and means holding said springs substantially horizontally parallel when they are in such connection.

2. A spring suspension system for a vehicle, embodying a frame and a pair of vertically spaced and substantially horizontally extending springs connecting a pair of wheels to the frame, one of said springs being bowed before being put into such connection, and the other spring being substantially straight before being put into such connection, said bowed spring being applied to the vehicle in a manner whereby it is substantially straightened out under normal load conditions, and said straight spring being applied to the vehicle in a manner to leave it substantially straight under normal load conditions.

3. A spring suspension system for a vehicle, embodying a frame and a pair of vertically spaced and substantially horizontally extending multi-leaf springs connecting a pair of wheels to the frame, one of said springs being bowed before being put into such connection, and the other spring being substantially straight before being put into such connection, and means holding said springs substantially horizontally parallel when they are in such connection, all the leaves of said one spring tending to bow it in one vertical direction said other spring embodying one leaf which is applied, in effect, at its opposite ends to the wheels, and leaves at opposite sides of said one leaf and having inherent tendencies to resist equally forces tending to bow said one leaf in opposite directions.

4. A spring suspension system for vehicles, embodying a frame and a pair of vertically spaced springs connecting a pair of wheels to the frame and supporting the frame, one of said springs having comparatively greater flexibility and being adapted to resist deflection more effectively in one vertical direction than in the other vertical direction, and the other of said springs having comparatively less flexibility and being adapted to resist vertical deflection substantially equally in opposite directions.

In witness that I claim the foregoing I have hereunto subscribed my name this 1st day of December, 1926.

OSCAR F. LUNDELIUS.